US006768484B2

(12) United States Patent
Sano et al.

(10) Patent No.: US 6,768,484 B2
(45) Date of Patent: Jul. 27, 2004

(54) TOUCH PANEL DEVICE

(75) Inventors: Satoshi Sano, Kawasaki (JP); Takashi Katsuki, Kawasaki (JP); Yuji Takahashi, Kawasaki (JP); Fumihiko Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 10/055,375

(22) Filed: Jan. 25, 2002

(65) Prior Publication Data

US 2003/0076308 A1 Apr. 24, 2003

(30) Foreign Application Priority Data

Oct. 23, 2001 (JP) ........................................ 2001-325328

(51) Int. Cl.⁷ ................................................. G09G 5/00
(52) U.S. Cl. ........................................ 345/173; 345/17.7
(58) Field of Search ................................ 345/173, 176, 345/177; 178/18.01, 18.04

(56) References Cited

U.S. PATENT DOCUMENTS

| 4,908,542 A | | 3/1990 | Solie | |
|---|---|---|---|---|
| 6,456,006 B1 | * | 9/2002 | Torisaki | 313/582 |
| 6,680,759 B2 | * | 1/2004 | Ogawa | 349/54 |
| 2002/0063510 A1 | * | 5/2002 | Yura et al. | 313/483 |
| 2002/0101408 A1 | * | 8/2002 | Sano et al. | 345/173 |
| 2002/0171635 A1 | * | 11/2002 | Takahashi et al. | 345/177 |
| 2003/0020695 A1 | * | 1/2003 | Toda | 345/177 |

FOREIGN PATENT DOCUMENTS

| JP | 7-36605 | | 2/1995 | |
|---|---|---|---|---|
| JP | 10163671 A | * | 6/1998 | G09F/9/00 |
| JP | 11-338625 | | 12/1999 | |
| JP | 200207127 A | * | 7/2000 | G06F/3/033 |
| JP | 2001-125725 | | 5/2001 | |

* cited by examiner

Primary Examiner—Amare Mengistu
(74) Attorney, Agent, or Firm—Westerman, Hattori, Daniels & Adrian, LLP

(57) ABSTRACT

In a touch panel device for detecting a position touched by an object by sensing an attenuation or break of surface acoustic waves, in which IDTs for exciting or receiving surface acoustic waves comprising comb-like electrode fingers aligned along confronting bus electrodes are placed on a peripheral area of a substrate, drawing electrodes connected to the bus electrode positioned closer to the center of the substrate and led out to the peripheral area side of the substrate are provided. Each of the IDT regions segmented by the drawing electrodes is constituted by repetition, and the drawing electrodes are disposed so that impedance in each IDT region becomes equal.

20 Claims, 17 Drawing Sheets

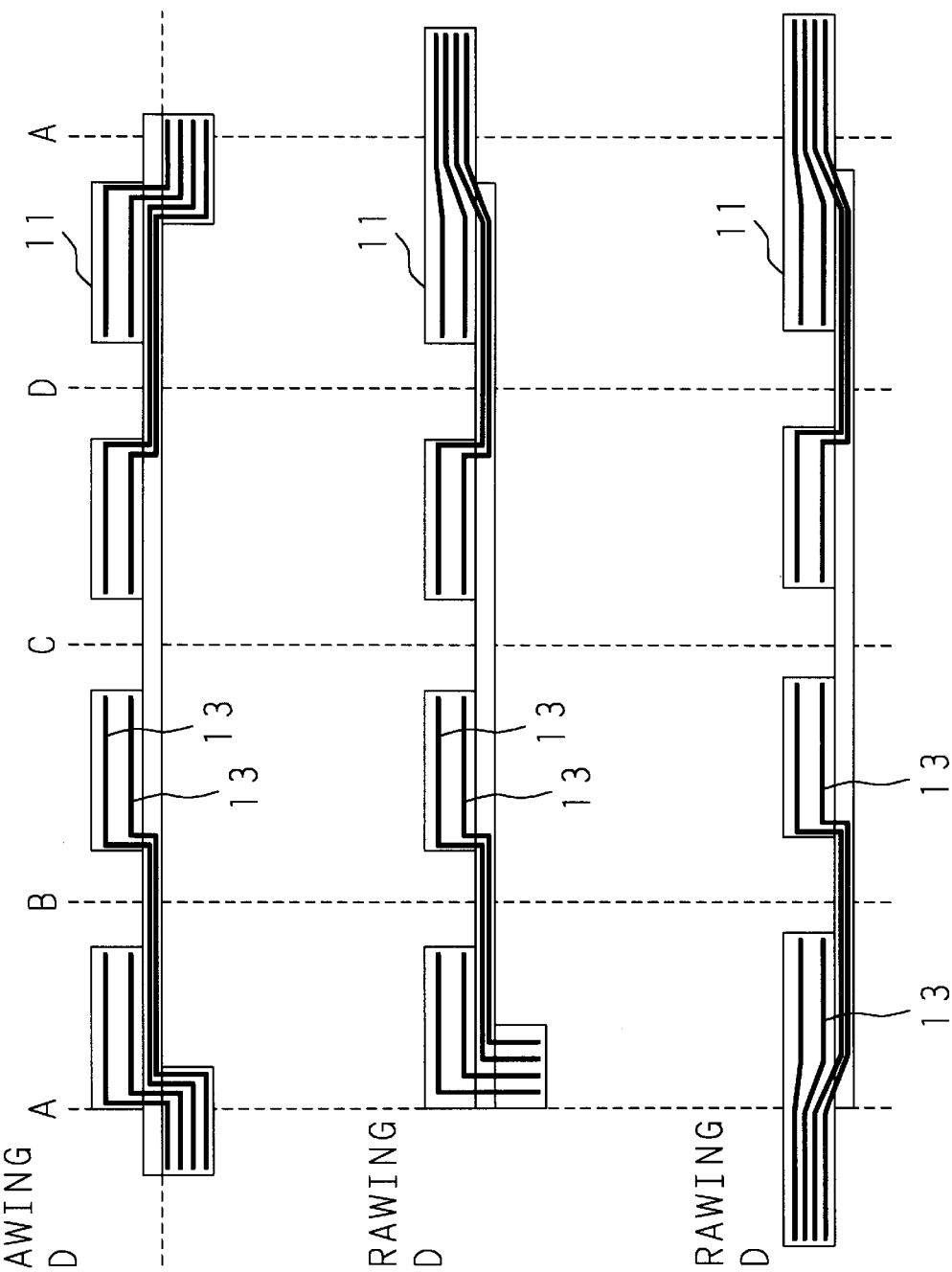

TOUCH PANEL DEVICE

BACKGROUND OF THE INVENTION

The present invention relates to a touch panel device for detecting a touch thereon of a finger or an object such as pen, more specifically to a touch panel device wherein an interdigital transducer (hereinafter referred to as "IDT") is used, for detecting a touched position by sensing an attenuation or break of surface acoustic wave (hereinafter referred to as "SAW").

Along with the growing popularity of computer systems mainly represented by personal computers, devices for inputting new information or giving various instructions to a computer system by touching a finger or pen on a screen of a display device on which information is displayed by a computer system have come to be widely utilized. When inputting operation is executed by a touching method in response to information displayed on a screen of a display device of a personal computer etc., a touched position (indicated position) has to be detected with a high accuracy.

Among touch panel devices for detecting a position touched by a finger or pen, those provided with resistance film and those in which ultrasonic wave is used are being popularly utilized. The former having a resistance film detects a change of partial ratio of voltage caused by a touch of an object on the resistance film. A device of this type has an advantage of low power consumption, but has a disadvantage in such aspects as response time, detection performance and durability.

On the other hand, a device in which ultrasonic wave is utilized propagates SAW on for instance a non-piezoelectric substrate, so that a position touched by an object is detected by sensing an attenuation of SAW caused by a touch of an object such as a pen on the non-piezoelectric substrate. The inventors of the present invention have been pursuing studies and development of a touch panel device, wherein IDT that can be formed in a batch by a photolithography technique is used as a transducer for exciting or receiving SAW. In the mentioned touch panel device, an element constituted by IDT and piezoelectric thin film is employed as an excitation element for exciting of SAW or a receiving element for receiving the propagated SAW.

FIG. 1 is a schematic drawing showing a configuration of a conventional touch panel device wherein IDTs are used in the mentioned manner. Referring to FIG. 1, reference numeral 60 stands for a rectangular non-piezoelectric substrate made of for instance a glass material, and on one of the respective end portions of X-direction and Y-direction of non-piezoelectric substrate 60, a plurality of excitation elements 65 consisting of input IDT and piezoelectric thin film for exciting SAW are aligned in such a manner that each of them corresponds to each of a plurality of tracks. Also, on the other respective end portions of X-direction and Y-direction of non-piezoelectric substrate 60, a plurality of receiving elements 66 consisting of output IDT and piezoelectric thin film for receiving SAW are aligned so as to confront excitation elements 65.

In a touch panel device of FIG. 1, electric signals are inputted to each of excitation elements 65 to excite SAW so that SAW is propagated on the non-piezoelectric substrate 60, and each of receiving elements 66 receives the propagated SAW. And when an object touches on a propagating route of SAW on the non-piezoelectric substrate 60, SAW is attenuated. Therefore whether and a position where an object touched can be detected by sensing whether an attenuation of signal level received by the receiving elements 66 has taken place.

Also, the inventors of the invention offer a touch panel device wherein excitation elements and receiving elements are disposed so as to propagate SAW diagonally (along diagonal lines). FIG. 2 is a schematic drawing showing a configuration of electrodes of the mentioned touch panel device. Referring to FIG. 2, numeral 70 stands for a rectangular non-piezoelectric substrate made of for instance a glass material, and a central area surrounded by broken lines is a detecting region 70a where a touched position can be detected.

In the frame region outside of the detecting region 70a, which corresponds to the peripheral area of non-piezoelectric substrate 70, four IDTs 71 are placed. Each IDT 71 is provided with bus electrodes 72, 72 confronting each other and respectively comprising comb-like electrode fingers 73 that are bent halfway and alternately aligned. By such an arrangement, a row of comb-like electrode fingers 73 inclined in two directions from the confronting direction of bus electrodes 72, 72 is formed, which enables excitation of SAW in two directions and reception of SAW from two directions. In this example, IDTs 71 on the upper and lower sides are functioning as excitation elements for exciting SAW in two different directions at a time, while IDTs 71 on the left and right sides as receiving elements for receiving SAW from two different directions.

On the upper and lower sides, terminals 74, 74 for inputting and grounding connected to bus electrodes 72 of the respective IDTs 71 are provided. Also, terminals 74, 74 for outputting and grounding connected to bus electrodes 72 of the respective IDTs 71 are provided on the left and right sides. And to each of terminals 74, each of leading lines 77 is connected.

FIG. 3 is a schematic drawing of a flexible substrate 78 corresponding to FIG. 2. On the flexible substrate 78 a conductor pattern 79 is formed at a position corresponding to leading lines 77. And when such flexible substrate 78 is placed over a configuration of electrodes shown in FIG. 2, a touch panel device is constituted.

It is advantageous from a viewpoint of mounting process to utilize the flexible substrate 78 for drawing out signals from a touch panel device. As shown in FIGS. 2 and 3, IDTs 71 surrounded by long-sized bus electrodes 72 are disposed on the sides in the frame region closer to the detecting region 70a, around which leading lines 77 are disposed, and all leading lines 77 are united at one side. Leading lines 77 united in this way are connected to an exterior circuit through the conductor pattern 79 on the flexible substrate 78. Now, since the frame region is an area where a touched position cannot be detected, it is a critical factor for enhancing a product value to minimize the area of the frame region, and for such a purpose it is essential to narrow the width of bus electrodes 72 and leading lines 77.

In a conventional configuration as shown in FIGS. 2 and 3, a problem is that intensity of received SAW is lowered due to a resistance loss that is caused while a signal is transmitted through each of long-sized bus electrodes of IDTs placed all over the panel. In order to prevent such a resistance loss it is necessary to increase the width of bus electrodes and leading lines, which, however, is contradictory to the purpose of minimizing the area of the frame region. Meanwhile it might be another option to increase film thickness of the mentioned components, but in this case still a problem remains that production process will be more complicated, because the optimum condition of film thickness is different between excitation/reception unit (IDT) and transmission unit (bus electrodes and leading lines).

SUMMARY OF THE INVENTION

An object of the present invention is to provide a touch panel device wherein a resistance loss in a transmission unit can be minimized without enlarging a frame region.

Another object of the invention is to provide a touch panel device wherein the frame region can be further narrowed.

A touch panel device according to the first aspect of the invention comprises IDTs for exciting or receiving SAW placed on a peripheral area of a substrate, in which comb-like electrode fingers are aligned along bus electrodes confronting each other in a direction that is aligned with a direction from the center toward the periphery of the substrate, and at least one drawing electrode connected to the bus electrode positioned closer to the center of the substrate and led out to the peripheral area side of the substrate.

In the touch panel device of the first aspect, the drawing electrode is disposed from the bus electrode positioned closer to the center of the substrate to the peripheral area side of the substrate through inside of IDT. As a result, a signal will pass through the drawing electrode instead of being transmitted through long-sized bus electrodes one after another, therefore resistance loss in the bus electrodes is reduced.

The touch panel device according to the second aspect of the invention is the device of the first aspect, wherein IDT has a repeated constitution due to the segmentation by the drawing electrode.

In the touch panel device of the second aspect, IDT is evenly segmented into a plurality of regions by the drawing electrode. As a result, conversion efficiency of SAW excited at each side is leveled, therefore the conversion process can be simplified.

The touch panel device according to the third aspect of the invention is the device of the second aspect, wherein the drawing electrode is disposed so that impedance of each segmented region of IDT becomes equal.

In the touch panel device of the third aspect, impedance of each region of IDT segmented by the drawing electrodes is equal. As a result, excitation efficiency can be leveled.

The touch panel device according to the fourth aspect of the invention is the device of the third aspect, wherein electrostatic capacity of each segmented region of IDT is equal.

In the touch panel device of the fourth aspect, electrostatic capacity of each region of IDT segmented by the drawing electrode is equal. As a result, a stabilized drive detection can be performed.

The touch panel device according to the fifth aspect of the invention is the device of the third aspect, further comprising a plurality of drawing electrodes as in the third aspect, and resistance value of each of the plurality of drawing electrodes is equal.

In the touch panel device of the fifth aspect, resistance value of each of the plurality of drawing electrodes is equal. As a result, influence of resistance loss can be restrained within a certain level in each segmented region.

The touch panel device according to the sixth aspect of the invention is the device of any of the first to fifth aspects, wherein the width of the drawing electrode is $(\frac{3}{8}+n)\lambda$ ($\lambda$: wavelength of the SAW, n: an integer that is not negative).

In the touch panel device of the sixth aspect, the width of the drawing electrode is set as $(\frac{3}{8}+n)\lambda$ ($\lambda$: wavelength of the SAW, n: an integer that is not negative), therefore characteristic prediction can be made based on design parameters and a drop of excitation efficiency can be prevented.

The touch panel device according to the seventh aspect of the invention is the device of the sixth aspect, wherein the drawing electrode of the sixth aspect is of a metal strip array.

In the touch panel device of the seventh aspect, the drawing electrode is of a metal strip array. As a result, canceling effect of reflected wave can be expected also from the drawing electrode, and influence of unnecessary mechanical reflection that may occur in IDT can be alleviated.

The touch panel device according to the eighth aspect of the invention is the device of any of the first to seventh aspects, wherein at least one pad connected to the drawing electrode is provided within the bus electrode.

In the touch panel device of the eighth aspect, the pad connected to the drawing electrode is provided within the bus electrode. As a result, resistance can be reduced utilizing conductor unit of the bus electrode, and the frame region can be narrowed by omitting the area for the pad, besides influence of imperfect contact can be minimized thus resulting in an improved yield.

A touch panel device according to the ninth aspect of the invention comprises IDTs for exciting or receiving SAW placed on a peripheral area of a substrate, in which comb-like electrode fingers are aligned along bus electrodes confronting each other in a direction that is aligned with a direction from the center toward the periphery of the substrate; at least one drawing electrode connected to the bus electrode positioned closer to the center of the substrate and led out to the peripheral area side of the substrate; at least one pad placed in the drawing electrode; and a flexible substrate having at least one connection unit corresponding to the pad.

In the touch panel device of the ninth aspect, as in the first aspect, the drawing electrode is disposed from the bus electrode positioned closer to the center of the substrate to the peripheral area side of the substrate through inside of IDT, and a signal will pass through the drawing electrode instead of being transmitted through long-sized bus electrodes one after another, therefore resistance loss in the bus electrodes is reduced. In addition, the flexible substrate is placed. As a result, resistance loss can be further reduced and transmission can be stabilized.

The touch panel device according to the tenth aspect of the invention is the device of the ninth aspect, wherein the flexible substrate is disposed so as to cover the IDT.

In the touch panel device of the tenth aspect, the IDT is covered with the flexible substrate, which can also serve as a buffer member against an unexpected impact, resulting in a higher reliability.

The touch panel device according to the eleventh aspect of the invention is the device of the tenth aspect, wherein the flexible substrate has at least one leading line connected to the drawing electrode on a portion thereof covering the IDT.

In the touch panel device of the eleventh aspect, the leading line connected to the drawing electrode is disposed over the IDT. As a result, the frame region can be narrowed.

The touch panel device according to the twelfth aspect of the invention is the device of any of the ninth to eleventh aspects, wherein the flexible substrate is of a form folded in a direction of thickness of the substrate.

In the touch panel device of the twelfth aspect, the flexible substrate is of a form folded in a direction of thickness of the substrate on which the IDT is placed. As a result the leading line can be disposed along the folded portion, therefore the frame region can be further narrowed.

The touch panel device according to the thirteenth aspect of the invention is the device of the twelfth aspect, wherein the flexible substrate can be unfolded one-dimensionally.

In the touch panel device of the thirteenth aspect, the flexible substrate having a two-dimensional structure can be unfolded to a one-dimensional form. Therefore a mass production can be easily executed.

The above and further objects and features of the invention will more fully be apparent from the following detailed description with accompanying drawings.

BRIEF DESCRIPTION OF THE DRAWINGS

FIGS. 17A to 17C are schematic drawings showing examples of unfolded forms of flexible substrates.

DESCRIPTION OF THE PREFERRED EMBODIMENTS

Figure 1:
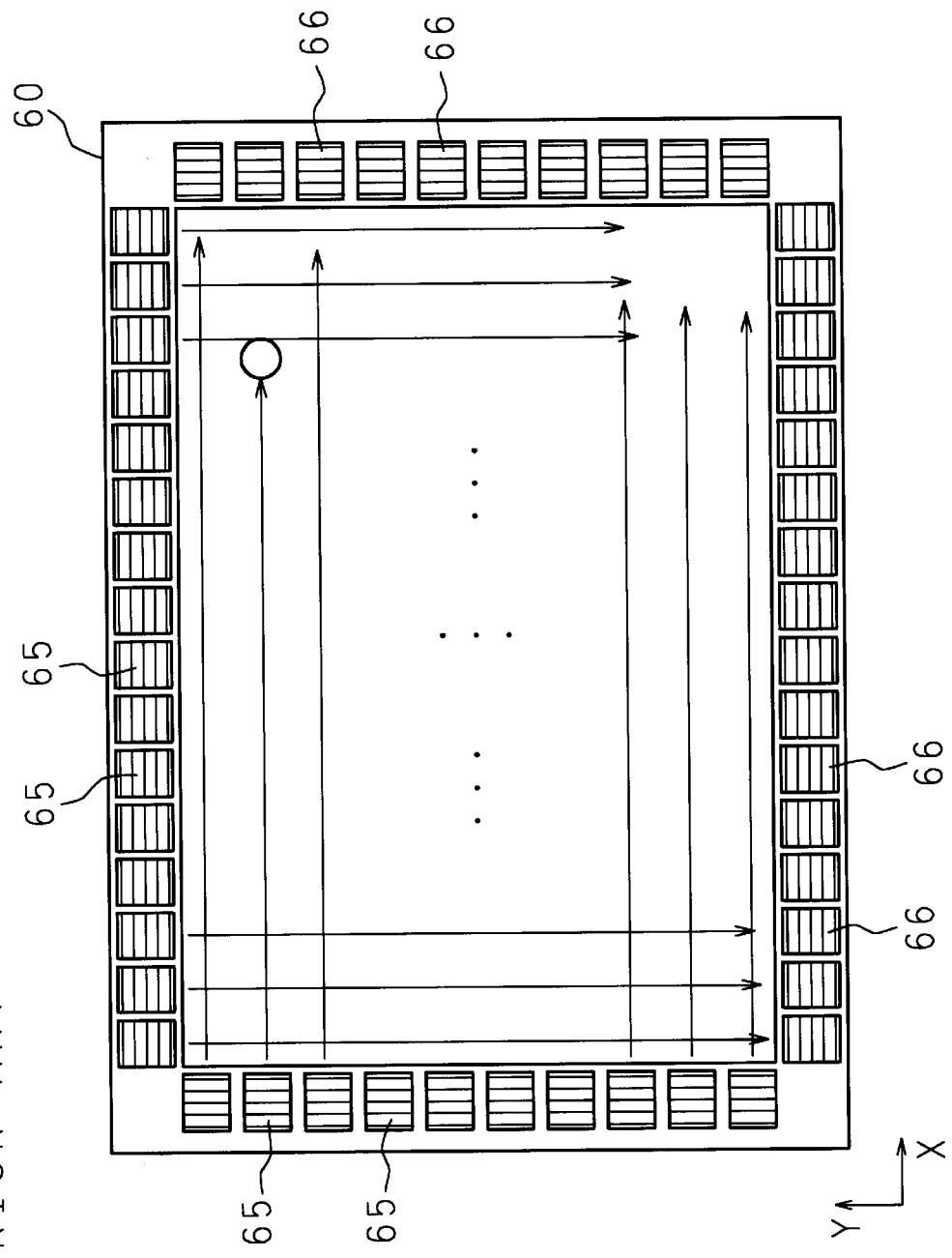
FIG. 1 is a schematic drawing showing a configuration of a conventional touch panel device.
Figure 2:
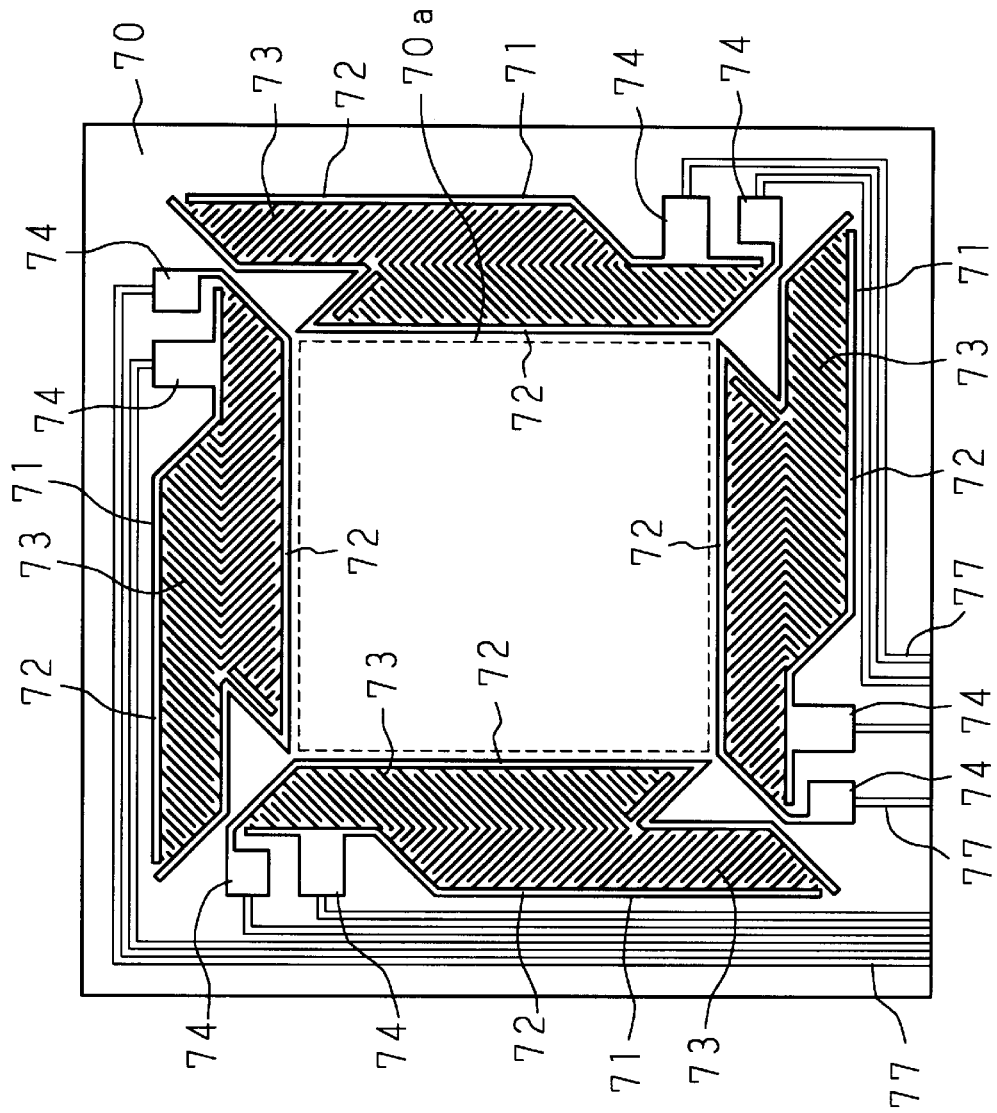
FIG. 2 is a schematic drawing showing a configuration of electrodes in a conventional touch panel device.
Figure 3:
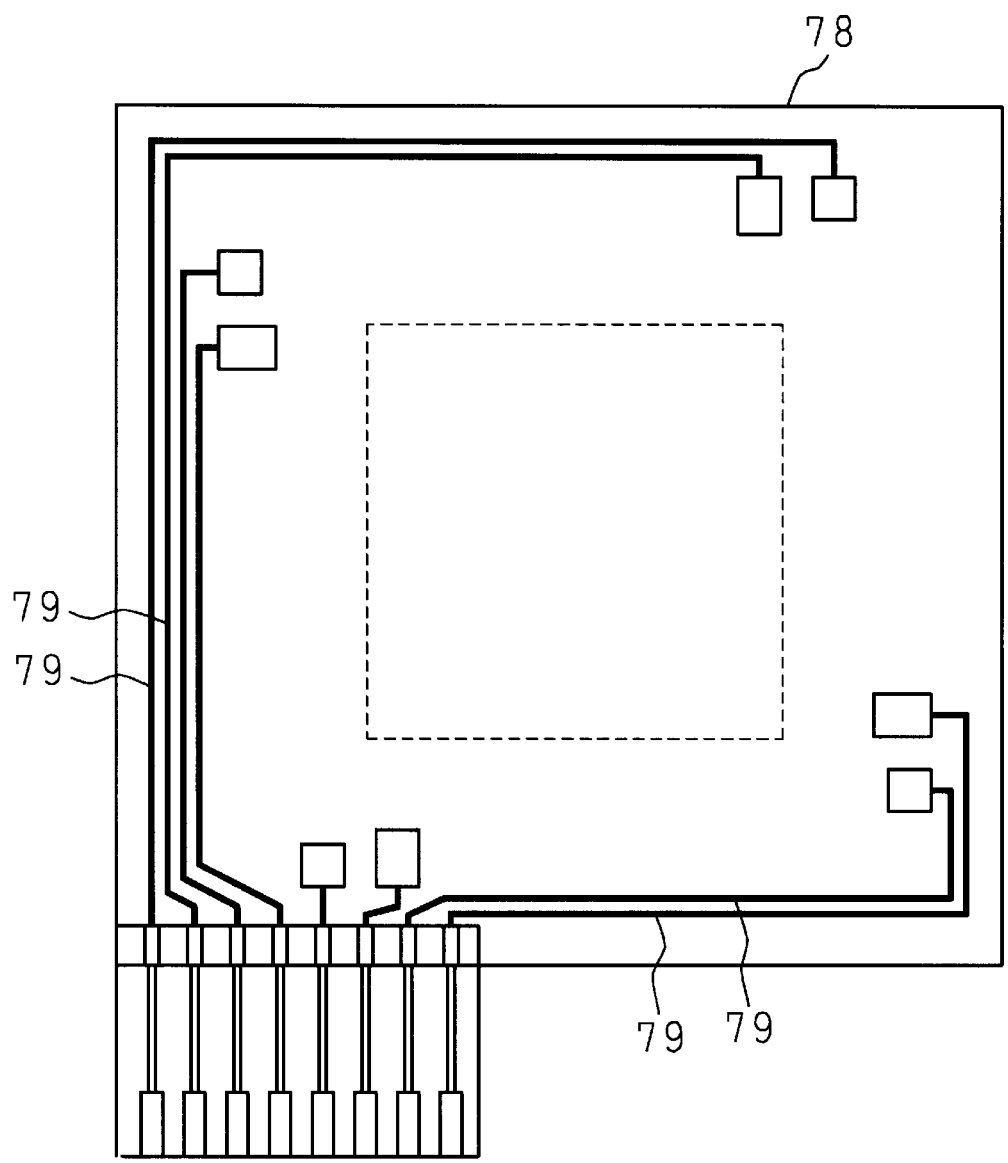
FIG. 3 is a schematic drawing showing a conventional flexible substrate.

The present invention shall now be described in further details hereunder, referring to the drawings showing the embodiments of the invention.

(First Embodiment)

Figure 4:
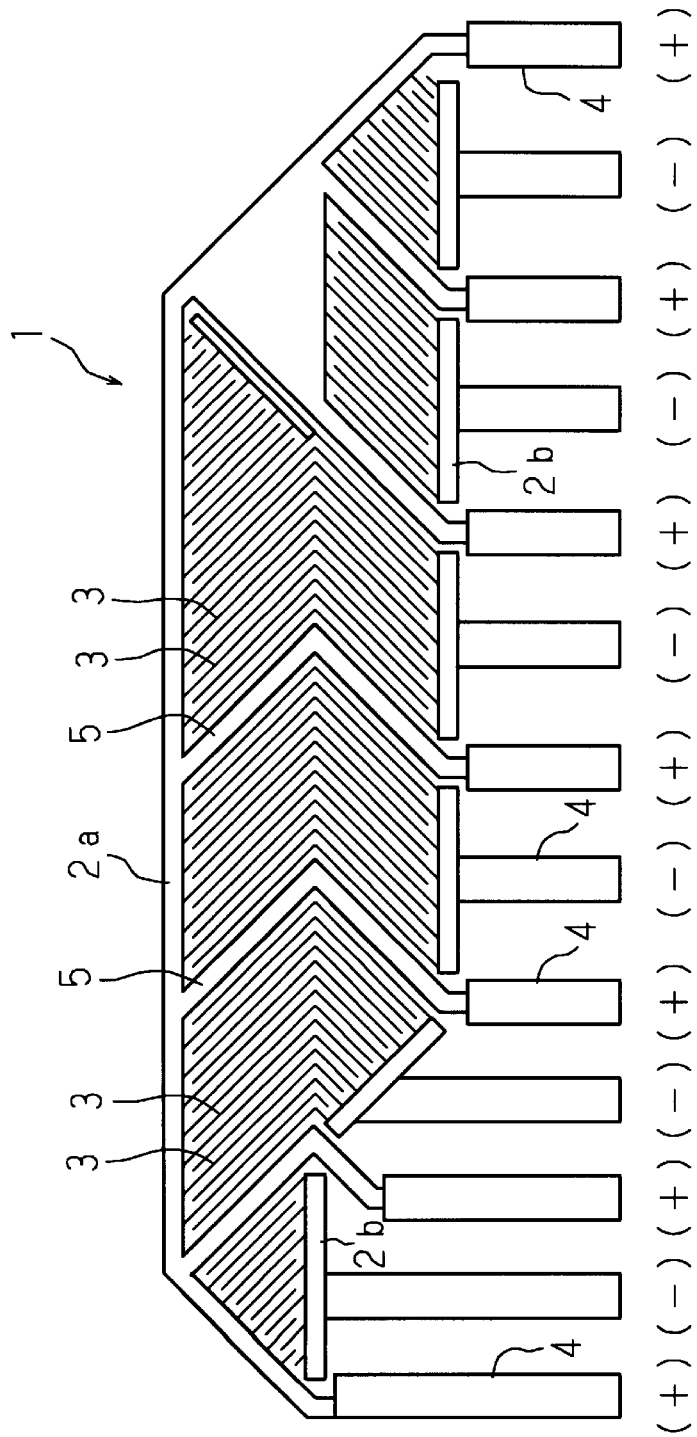
FIG. 4 is a schematic drawing showing a configuration of an example of IDT according to the present invention.

FIG. 4 is a schematic drawing showing a configuration of IDT to be used as excitation element or receiving element in a touch panel device according to the invention. IDT 1 of the invention is provided with bus electrodes $2a$, $2b$ confronting each other and respectively comprising comb-like electrode fingers 3 that are bent halfway and alternately aligned. By such an arrangement, in the IDT 1 of the invention a row of comb-like electrode fingers 3 inclined in two directions from the confronting direction of bus electrodes $2a$, $2b$ is formed, which enables excitation of SAW in two directions and reception of SAW from two directions, as in the prior art.

The bus electrode $2a$ positioned closer to the center of the panel (on the detecting region side) is long-sized as in the prior art, and this bus electrode $2a$ is for instance a (+)side electrode, ends of which are connected to (+)side pads 4. Inside of the IDT 1, a plurality of drawing electrodes 5 connected to the bus electrode $2a$ are passing in a constant pitch, bent halfway and in parallel with the comb-like electrode fingers 3. These drawing electrodes 5 are respectively connected to (+)side pads 4. The bus electrode $2b$ on the peripheral area side of the panel (farther side from the detecting region) is for instance a (−)side electrode, and each bus electrode $2b$ is connected to a (−)side terminal 4.

The IDT 1 is segmented into repetitions of a plurality of regions by the mentioned plurality of drawing electrodes 5. As a result, excitation intensity of SAW in each segmented region becomes nearly constant, and impedance in each segmented region also becomes nearly equal. Specifically, electrostatic capacity that is determined by the pitch and length (cross width) of drawing electrode 5 in each segmented region is made nearly constant, and likewise the width and length of each drawing electrode 5 are adjusted so that its resistance becomes nearly equal.

Figure 5:
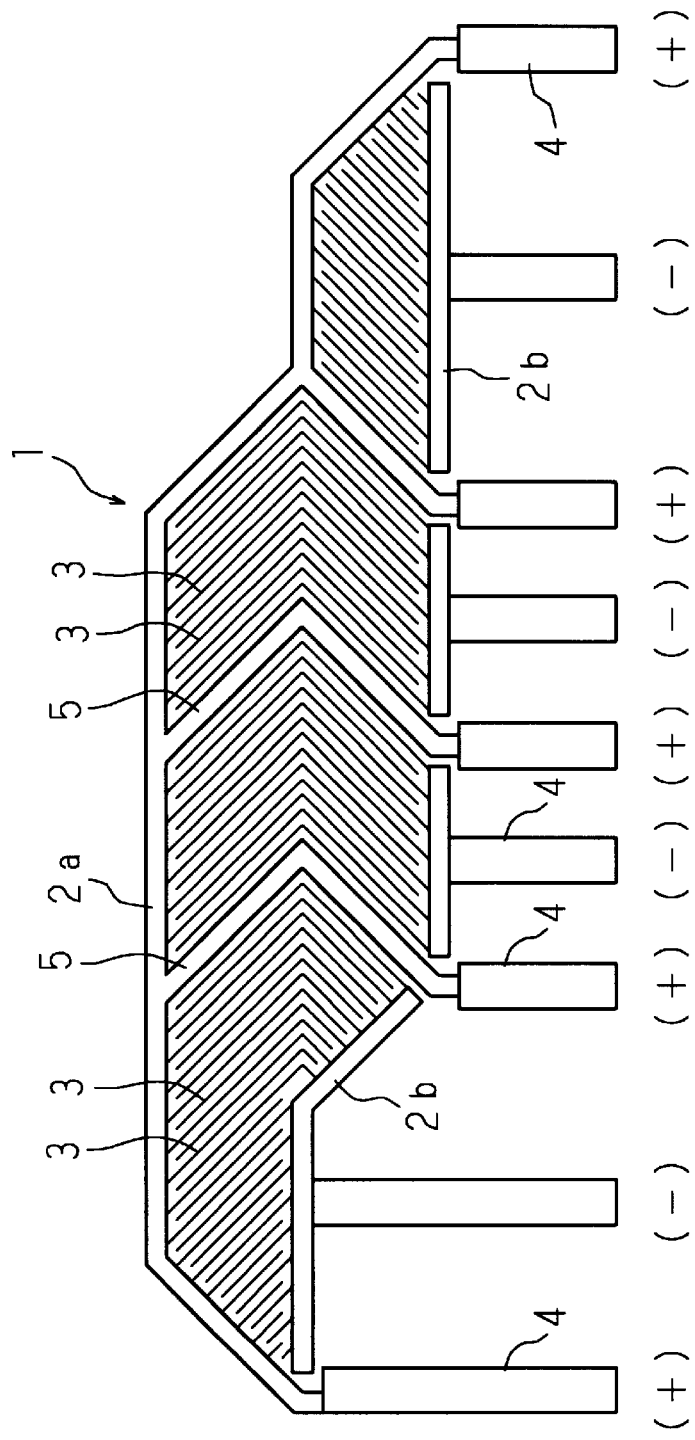
FIG. 5 is a schematic drawing showing a configuration of another example of IDT according to the invention.

FIG. 5 is a schematic drawing showing another configuration of IDT 1 according to the invention. The example shown in FIG. 5 is a simplified configuration of intersection of electrodes corresponding to the right hand side of FIG. 4, by which a complication of electrode pattern (bus electrodes $2a$, $2b$ and drawing electrodes 5) is alleviated, and resistance load imposed on a part of drawing electrodes 5 is also alleviated. Also, in this configuration the pitch of drawing electrodes 5 becomes twice as large since the aperture of a corner of IDT 1 becomes a half, therefore excitation efficiency at this portion is intensified.

(Second Embodiment)

Figure 6:
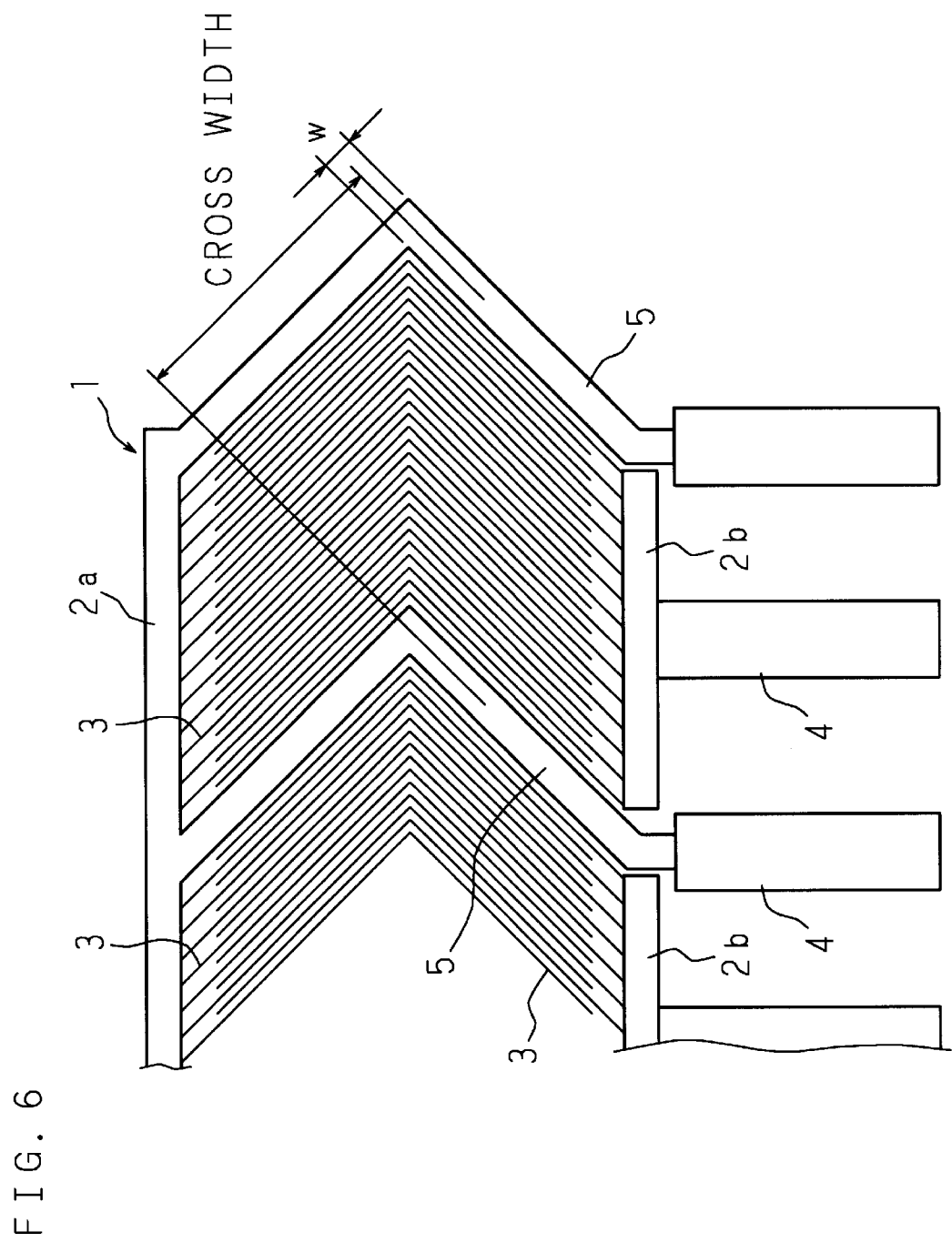
FIG. 6 is an enlarged fragmentary schematic drawing of an example of IDT according to the invention.

The following description relates to the pitch and width of drawing electrodes 5. FIG. 6 is an enlarged fragmentary schematic drawing of an example of IDT 1 according to the invention. The example of IDT 1 shown in FIG. 6 is provided with confronting bus electrodes $2a$, $2b$ from each of which comb-like electrode fingers 3 are alternately drawn out one by one and bent halfway (single bent electrode finger type).

In adjacent regions of IDT 1 segmented by the drawing electrodes 5, the pitch and width of drawing electrodes 5 are determined in such a manner that formation pattern of comb-like electrode fingers 3 will not be disordered when the drawing electrodes 5 are added. It is preferable that the pitch of drawing electrodes 5 is an integral multiple of the cross width in one of the directions determined by a formation pattern of comb-like electrode fingers 3, and best of all it is optimum to make it equal to the cross width.

Figure 7A:
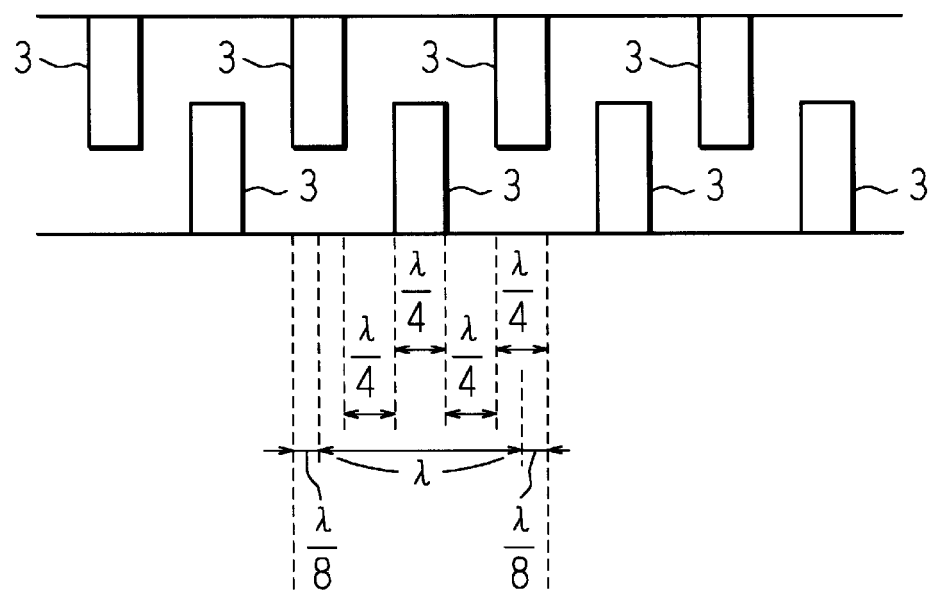
FIGS. 7A and 7B are conceptual drawings showing configurations of comb-like electrode fingers of IDT in FIG. 6.
Figure 7B:
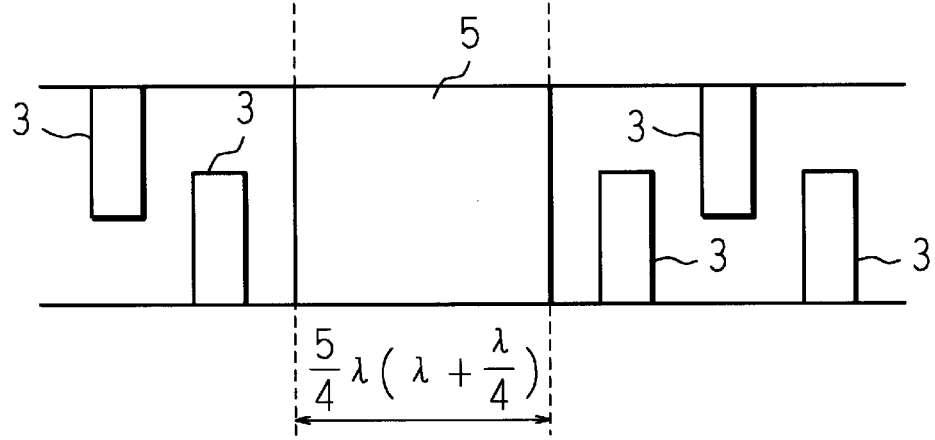

Further, it is preferable that the width w of drawing electrodes 5 is determined as $w=(\frac{1}{4}+n)\lambda$, where $\lambda$ is a wavelength of SAW and n is a natural number. FIG. 7A is a conceptual drawing of a configuration of comb-like electrode fingers 3, wherein the width of a comb-like electrode finger 3 is $\lambda/4$, while an interval between adjacent comb-like electrode fingers 3 is also $\lambda/4$. When the drawing electrode 5 is formed with a width determined as for example w=(λ+ λ/4)=5λ/4 where n=1 (as FIG. 7B) for the mentioned formation pattern of comb-like electrode fingers 3, the electrode pattern will not be disordered though the drawing electrode 5 thus formed is added.

Figure 8:
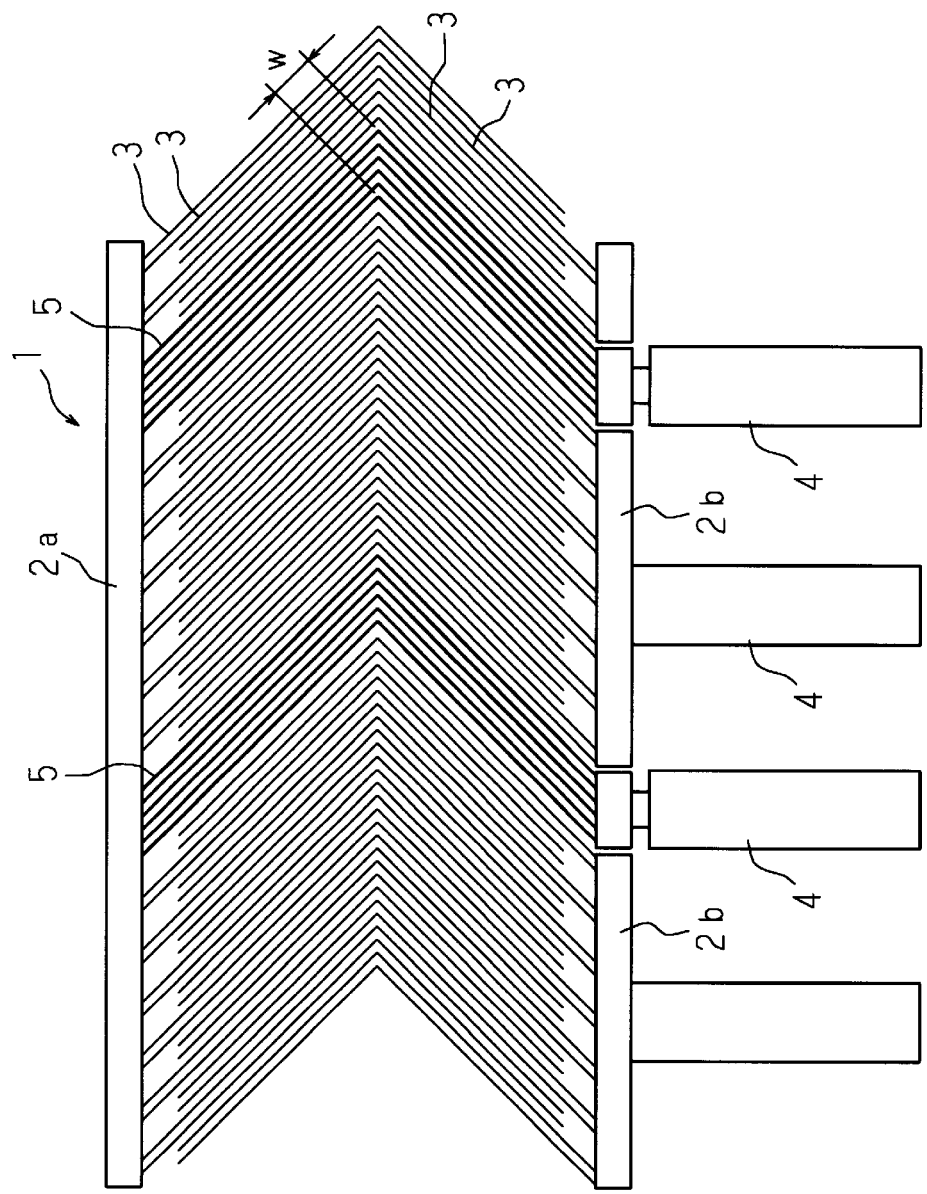
FIG. 8 is an enlarged fragmentary schematic drawing of another example of IDT according to the invention.

FIG. 8 is an enlarged fragmentary schematic drawing of another example of IDT 1 according to the invention. The example of IDT 1 shown in FIG. 8 is provided with confronting bus electrodes 2a, 2b from each of which comb-like electrode fingers 3 are alternately drawn out two by two and bent halfway (double bent electrode fingers type). As a result of such a configuration, an influence of reflection of SAW in comb-like electrode fingers 3 is restrained. Also, the drawing electrodes 5 are constituted by a plurality of electrode lines of the same width as that of comb-like electrode fingers 3, so that an influence of reflection can also be restrained in the drawing electrodes 5.

Figure 9A:
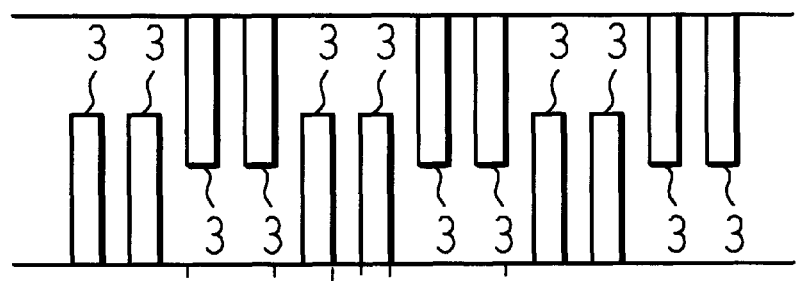
FIGS. 9A and 9B are conceptual drawings showing configurations of comb-like electrode fingers of IDT in FIG. 8.
Figure 9B:
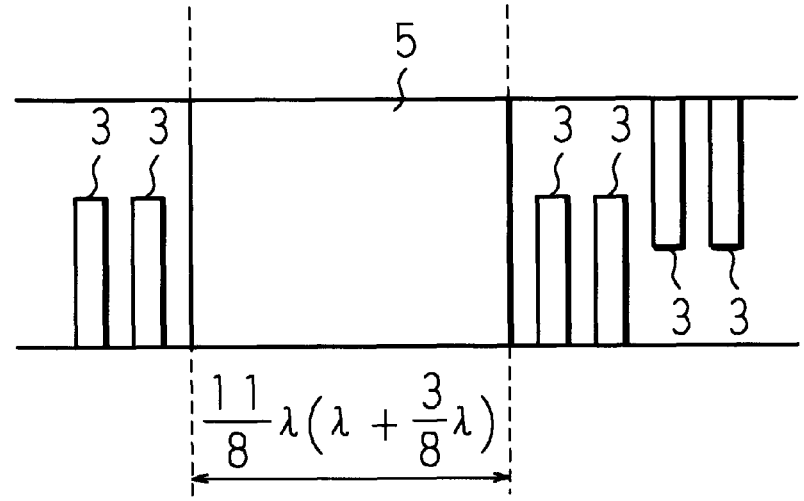

It is preferable that the width w of drawing electrodes 5 is determined as w=(3/8+n)λ (n: an integer that is not negative), where λ is a wavelength of SAW. FIG. 9A is a conceptual drawing of a configuration of comb-like electrode fingers 3, wherein the width of a comb-like electrode finger 3 is λ/8, while an interval between adjacent comb-like electrode fingers 3 is also λ/8. When the drawing electrode 5 is formed with a width determined as for example w=(λ+ 3λ/8)=11λ/8 where n=1 (as FIG. 9B) for the aforementioned formation pattern of comb-like electrode fingers 3, the electrode pattern will not be disordered though the drawing electrode 5 thus formed is added. Moreover, as a result of such a configuration of drawing electrodes 5, it is possible to maintain the comb-like structure of λ/8 that provides an advantage of restraining an influence of interior reflection of SAW.

(Third Embodiment)

Figure 10:
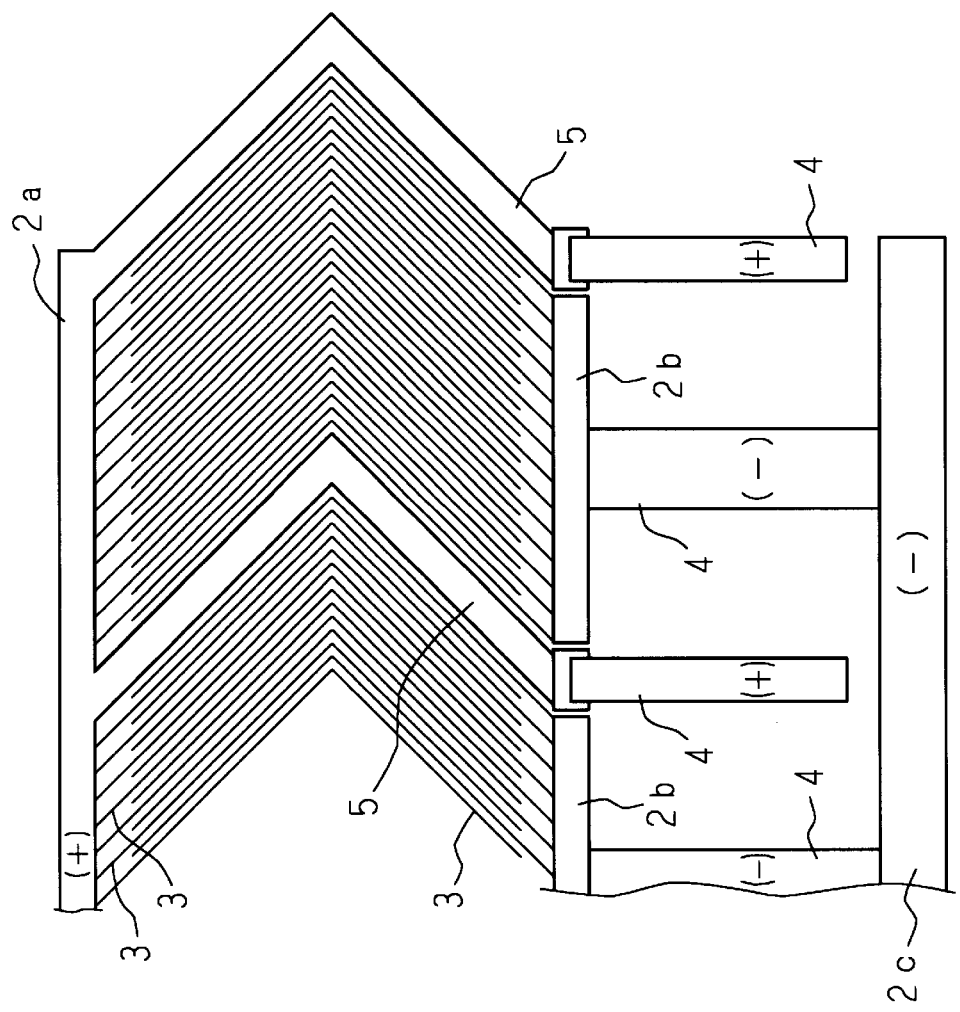
FIG. 10 is a schematic drawing showing a configuration of an example of pad.

Configurations of pads 4 of drawing electrodes 5 shall now be described. FIG. 10 is a schematic drawing showing a configuration of an example of pads 4, wherein a plurality of pads 4 on (−)side connected to for instance the bus electrode 2b are connected to still another a bus electrode 2c. Each of pads 4 on (+)side connected to the drawing electrodes 5 is disposed within a region enclosed by these bus electrodes 2b, 2c. In this configuration, even if an imperfect contact is caused in one of pads 4 it will not affect other pads 4 since all of (−)side pads 4 are connected to the bus electrode 2c, therefore production yield can be improved.

Figure 11:
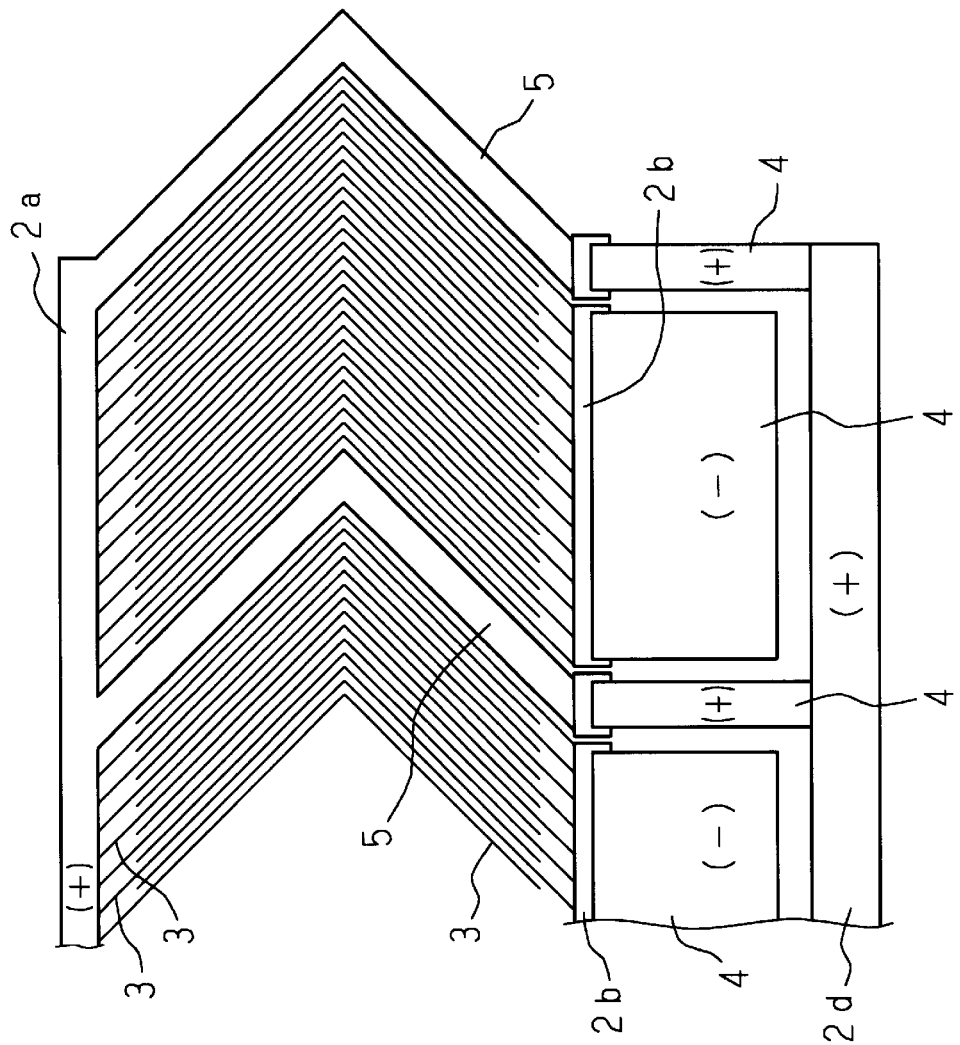
FIG. 11 is a schematic drawing showing a configuration of another example of pad.

FIG. 11 is a schematic drawing showing a configuration of another example of pads 4, wherein a bus electrode 2d is utilized as pads for the drawing electrodes 5. As a result of such a configuration the area of pads can be omitted, therefore the frame region can be narrowed. In addition, in case the drawing electrodes 5 are used as electrodes for grounding and the pads 4 connected to the bus electrodes 2b are used as pads for signals in this configuration, influence of crosstalk from outside such as other driving signals can be reduced because the pads for signals are disposed between the electrodes for grounding.

(Fourth Embodiment)

Figure 12A:
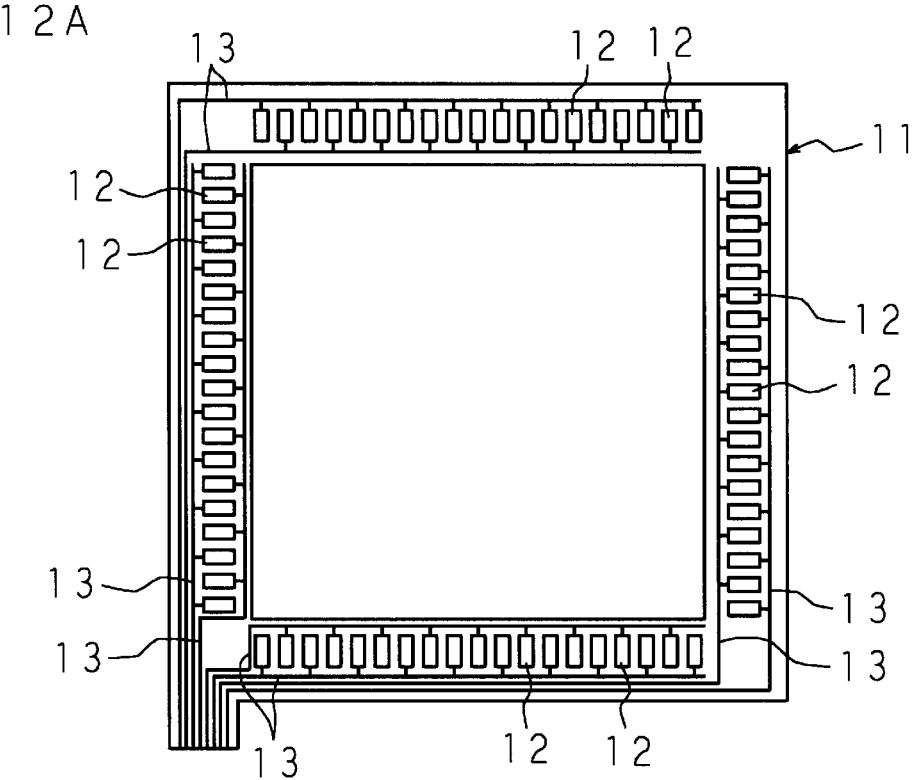
FIG. 12A is a schematic drawing showing a total configuration of a flexible substrate.
Figure 12B:
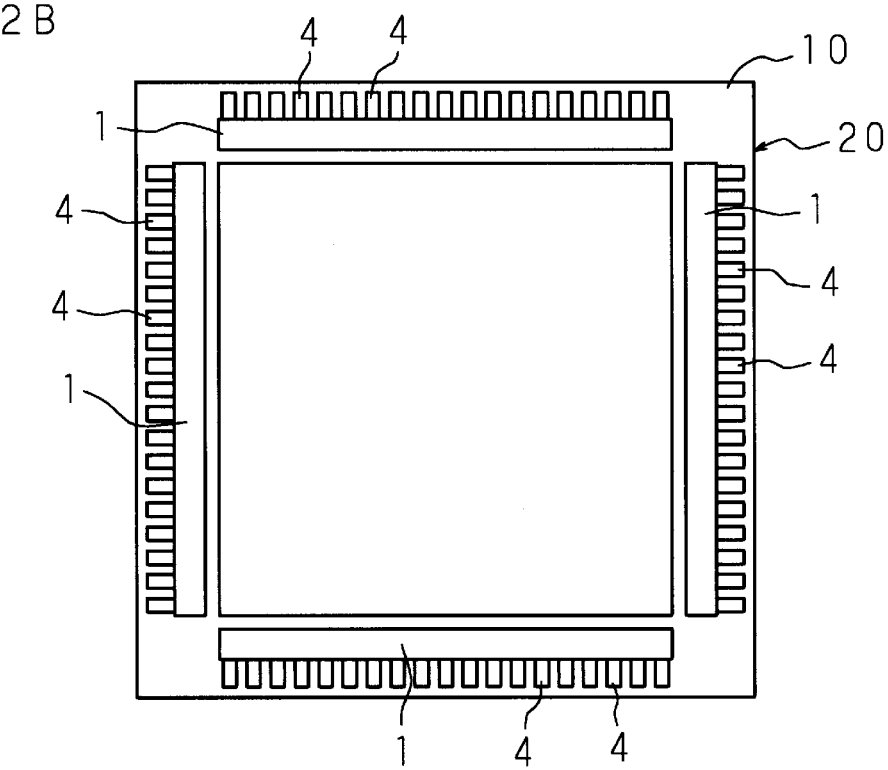
FIG. 12B is a schematic drawing showing a panel body.

Now the following description relates to a flexible substrate 11 to be placed over a panel body 20 consisting of a non-piezoelectric substrate 10 provided with the foregoing IDTs 1 and pads 4, etc. FIG. 12A is a schematic drawing showing a total configuration of a flexible substrate 11, and FIG. 12B is a schematic drawing of the panel body 20. The flexible substrate 11 is provided with a plurality of connection units 12 respectively corresponding to the plurality of pads 4 on the panel body 20 and leading lines 13 connected to the connection units 12 for extracting signals toward outside. Accordingly, signals are transmitted through the leading lines 13 with a low resistance provided on the flexible substrate 11, resulting in a reduction of resistance loss.

Figure 13A:
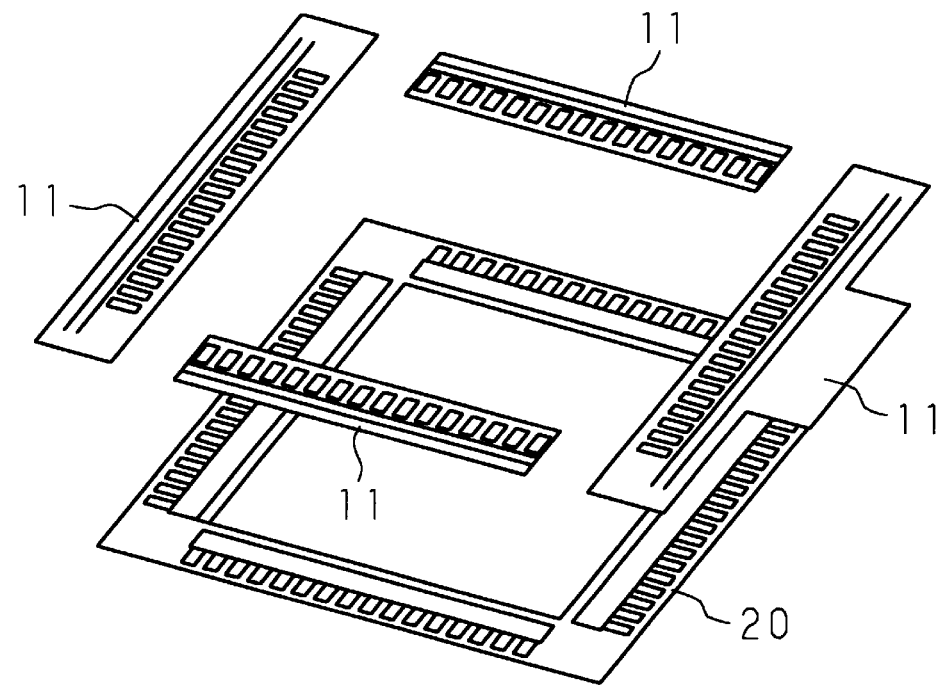
FIGS. 13A and 13B are perspective views showing a configurations of flexible substrates.
Figure 13B:
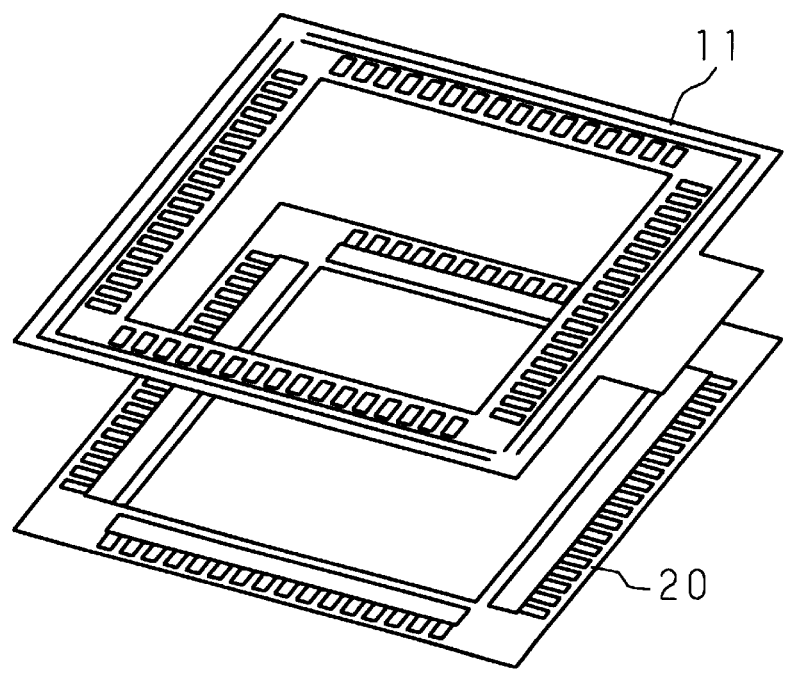

Also, the flexible substrate 11 can either be formed in four separate one-dimensional pieces so that each of them is placed over each of the four sides of the panel body 20 and bonded together as shown in FIG. 13A, or formed in a single piece of frame-shaped flexible substrate 11 according to the shape of the panel body 20, for covering all over the panel body 20 as shown in FIG. 13B.

Figure 14A:
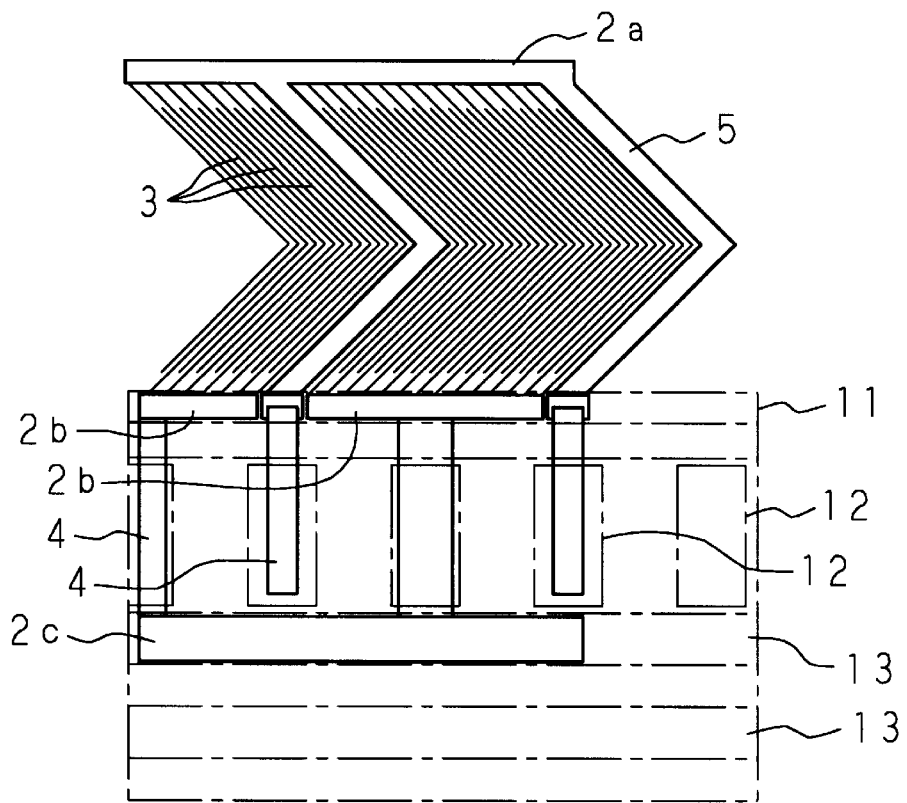
FIG. 14A is a plan view showing a layout example of a flexible substrate placed over a panel body.
Figure 14B:
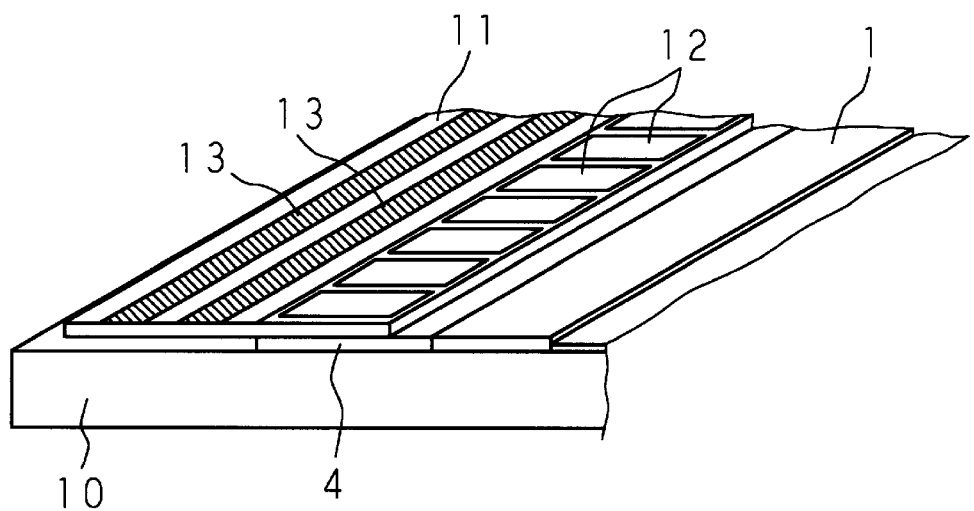
FIG. 14B is a perspective view showing a layout example of a flexible substrate placed over a panel body.
Figure 15A:
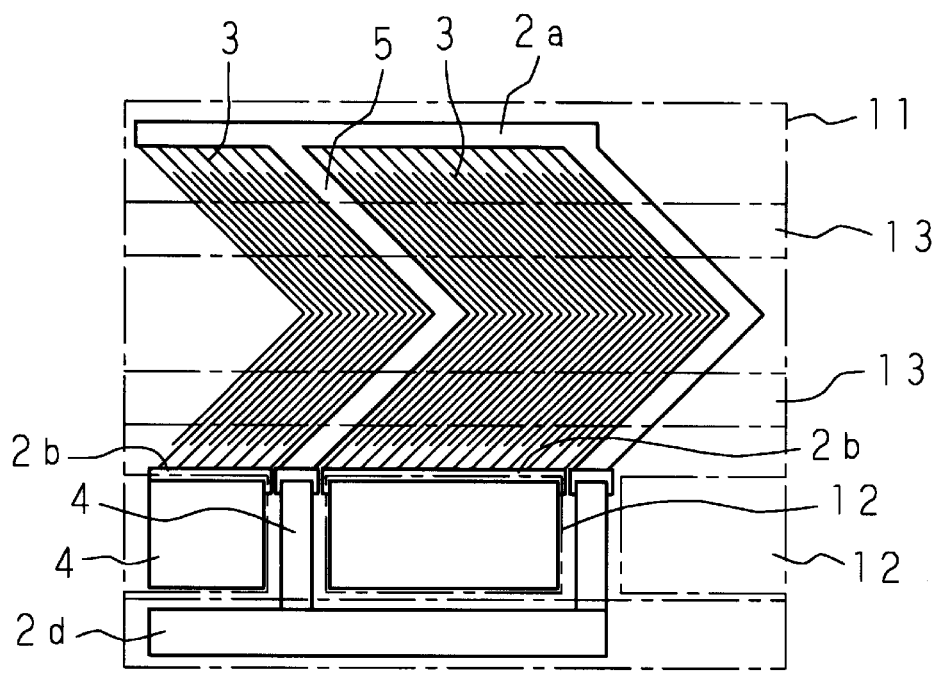
FIG. 15A is a plan view showing another layout example of a flexible substrate placed over a panel body.
Figure 15B:
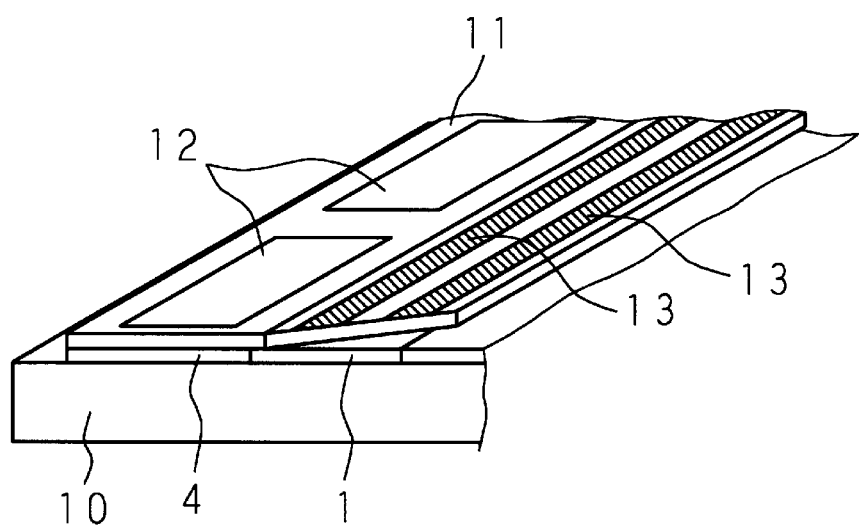
FIG. 15B is a perspective view showing another layout example of a flexible substrate placed over a panel body.

FIGS. 14A and 14B are a plan view and a perspective view respectively showing a layout example of the flexible substrate 11 placed over the panel body 20 provided with the pads of FIG. 10, and FIGS. 15A and 15B are a plan view and a perspective view respectively showing another layout example of the flexible substrate 11 placed over the panel body 20 provided with the pads of FIG. 11. Also, in FIGS. 14A and 15A, position of flexible substrate 11 placed over the panel body 20 is shown by the one-dot chain line.

In the examples shown in FIGS. 15A and 15B, the flexible substrate 11 is overlapping also on the IDT 1 on the panel body 20 and the leading lines 13 are disposed over the IDT 1 in a form of grade-separated intersection, therefore the frame region can be narrowed by more than 2 mm compared with the examples of FIGS. 14A and 14B.

Figure 16A:
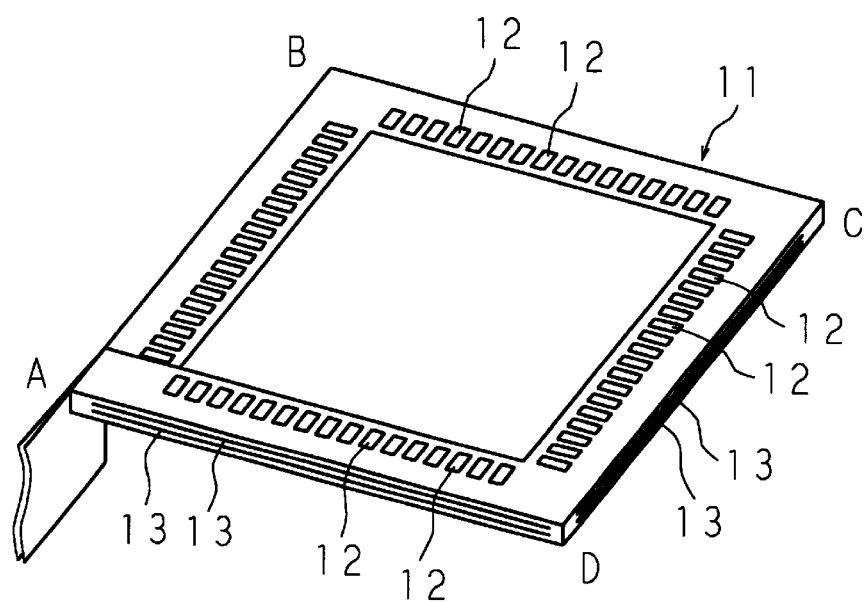
FIG. 16A is a perspective view showing a configuration of a folding type flexible substrate.
Figure 16B:
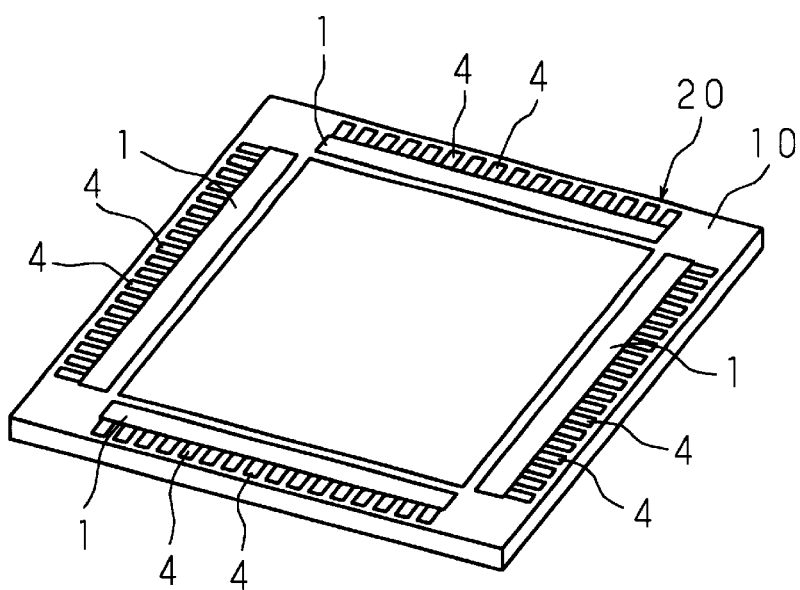
FIG. 16B is a perspective view showing a panel body.

FIGS. 16A and 16B are perspective views showing configurations of a folding type flexible substrate 11, which is another example of a form of flexible substrate 11. In these examples, the leading lines 13 are disposed around the perimetrical sides of the panel body 20, instead of on the upper surface of the panel body 20. In other words, the flexible substrate 11 is folded in a direction of thickness of the non-piezoelectric substrate 10 and the leading lines 13 are disposed along the folded portion. As a result the frame region of panel body 20 can be narrowed by such a portion that would be required for disposing the leading lines 13. Also, since a terminal unit that is leading out the leading lines 13 toward outside is separated into two positions, influence of crosstalk can also be alleviated.

Further, in case the flexible substrate 11 is to be formed by folding a one-dimensional material, a space defined by two-dimensional frame-shaped structure having an aperture at the center thereof can be formed without loss of materials, therefore a mass production at a low cost will be feasible. Especially, when the material is folded in one direction for forming the flexible substrate 11, the width of the material to be used becomes minimal, resulting in a further cost cutting. Examples of unfolded forms of flexible substrates 11 designed as described above are shown in FIGS. 17A to 17C. When the leading lines 13 are disposed in series on one face as FIG. 17B, the structure is significantly simplified and a general-use type flat connector can be used for connection.

As so far described, in a touch panel device according to the invention, the drawing electrode is disposed from the bus electrode positioned closer to the center of the substrate to the peripheral area of the substrate through inside of IDT, therefore resistance loss in the bus electrodes is reduced since signals will pass through the drawing electrode, and as a result the resistance loss in the transmission unit can be lowered without enlarging the frame region.

Also in a touch panel device according to the invention, the IDT is evenly segmented into a plurality of regions by the drawing electrode, therefore conversion efficiency of SAW excited at each side is leveled and the conversion process can be simplified. Also, since impedance of each region of IDT segmented by the drawing electrode is equal, excitation efficiency in each segmented region can be leveled. Also, since electrostatic capacity of each segmented region of IDT is equal, a stabilized drive detection can be performed. Further, since resistance value of each of the plurality of drawing electrodes is equal, influence of resistance loss can be restrained within a certain level in each region.

Also, in a touch panel device according to the invention, the width of the drawing electrode is set as $(3/8+n)\lambda$ ($\lambda$: wavelength of the SAW, n: an integer that is not negative), therefore characteristic prediction can be made based on design parameters and a drop of excitation efficiency can be prevented. Also, since the drawing electrode is of a metal strip array, canceling effect of reflected wave can be expected also from the drawing electrode, and influence of unnecessary mechanical reflection that may occur in IDT can be alleviated.

Further, in a touch panel device according to the invention, the pad connected to the drawing electrode is provided within the bus electrode, therefore resistance can be reduced utilizing conductor unit of the bus electrode, and the frame region can be narrowed by omitting the area for the pad, besides influence of imperfect contact can be minimized thus resulting in an improved yield.

Further, in a touch panel device according to the invention the flexible substrate is placed over the panel body, therefore resistance loss can be further reduced and transmission can be stabilized. Also, the IDT is covered with the flexible substrate, which can serve as a buffer member against an unexpected impact, therefore the reliability is increased. Also, since the leading line is disposed over the IDT, the frame region can be narrowed. Also, since the flexible substrate is folded in a direction of thickness of the panel body and the leading line is disposed along the side faces of the panel body, the frame region can be further narrowed. Furthermore, since a two-dimensional flexible substrate is formed by folding a one-dimensional material, a mass production at a low cost can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A touch panel device comprising:
    a substrate;
    IDTs for exciting or receiving surface acoustic waves, placed on a peripheral area of said substrate, having bus electrodes confronting each other in a direction that is aligned with a direction from the center toward the periphery of said substrate and comb-like electrode fingers aligned along said bus electrodes; and
    at least one drawing electrode connected to said bus electrode positioned closer to the center of said substrate and led out to the peripheral area side of said substrate.

2. The touch panel device as set forth in claim 1, wherein, said IDT has a repeated constitution due to the segmentation by said drawing electrode.

3. The touch panel device as set forth in claim 2, wherein said drawing electrode is disposed so that impedance of each segmented region of said IDT becomes equal.

4. The touch panel device as set forth in claim 3, wherein electrostatic capacity of each segmented region of said IDT is equal.

5. The touch panel device as set forth in claim 3, wherein a plurality of said drawing electrodes are provided, and resistance value of each of said plurality of drawing electrodes is equal.

6. The touch panel device as set forth in claim 2, wherein width of said drawing electrode is $(3/8+n)\lambda$ ($\lambda$: wavelength of the surface acoustic wave, n: an integer that is not negative).

7. The touch panel device as set forth in claim 6, wherein said drawing electrode is of a metal strip array.

8. The touch panel device as set forth in claim 2, wherein at least one pad connected to said drawing electrode is provided within said bus electrode.

9. The touch panel device as set forth in claim 1, wherein width of said drawing electrode is $(3/8+n)\lambda$ ($\lambda$: wavelength of the surface acoustic wave, n: an integer that is not negative).

10. The touch panel device as set forth in claim 9, wherein said drawing electrode is of a metal strip array.

11. The touch panel device as set forth in claim 1, wherein at least one pad connected to said drawing electrode is provided within said bus electrode.

12. A touch panel device comprising:
    a substrate;
    IDTs for exciting or receiving surface acoustic waves, placed on a peripheral area of said substrate, having bus electrodes confronting each other in a direction that is aligned with a direction from the center toward the periphery of said substrate and comb-like electrode fingers aligned along said bus electrodes;
    at least one drawing electrode connected to said bus electrode positioned closer to the center of said substrate and led out to the peripheral area side of said substrate;
    at least one pad provided in said drawing electrode; and
    a flexible substrate having at least one connection unit corresponding to said pad.

13. The touch panel device as set forth in claim 12, wherein
    said flexible substrate is disposed so as to cover said IDT.

14. The touch panel device as set forth in claim 13, wherein
    said flexible substrate has at least one leading line connected to said drawing electrode on a portion thereof covering said IDT.

15. The touch panel device as set forth in claim 14, wherein
    said flexible substrate is of a form folded in a direction of thickness of said substrate.

16. The touch panel device as set forth in claim 15, wherein
    said flexible substrate can be unfolded one-dimensionally.

17. The touch panel device as set forth in claim 13, wherein
    said flexible substrate is of a form folded in a direction of thickness of said substrate.

18. The touch panel device as set forth in claim 17, wherein
    said flexible substrate can be unfolded one-dimensionally.

19. The touch panel device as set forth in claim 12, wherein
    said flexible substrate is of a form folded in a direction of thickness of said substrate.

20. The touch panel device as set forth in claim 19, wherein
    said flexible substrate can be unfolded one-dimensionally.

* * * * *